United States Patent

[11] 3,566,073

[72] Inventor Thomas Joseph Black
 Middleburg Heights, Cuyahoga, Ohio
[21] Appl. No. 718,588
[22] Filed Apr. 3, 1968
[45] Patented Feb. 23, 1971
[73] Assignee The Lincoln Electric Company
 Cleveland, Ohio

[54] OUT-OF-POSITION AUTOMATIC CORED WELDING ELECTRODE
 20 Claims, 3 Drawing Figs.
[52] U.S. Cl. .................................................. 219/146
[51] Int. Cl. ................................................. B23k 35/22
[50] Field of Search ..................................... 219/146;
 117/205, 206, 207; 148/24, 26

[56] References Cited
UNITED STATES PATENTS
| | | | |
|---|---|---|---|
| 2,731,373 | 1/1956 | Wasserman | 148/26 |
| 3,177,340 | 4/1965 | Danhier | 219/146 |

Primary Examiner—J. V. Truhe
Assistant Examiner—Lawrence A. Rouse
Attorney—Meyer, Tilberry and Body ABSTRACT: Coredtype arc-welding steel electrode particularly intended for out-of-position welding wherein the ingredients in the core provide a pinch-effect type metal transfer at relatively low arc currents as well as a viscous slag which prevents the molten metal in the weld pool from being pulled out of the weld pool by the force of gravity. The ingredients making up the core provide a $CaF_2$ metallic oxide slag system which provides a shielding action to the arc, plus as an essential ingredient(s), a compound of barium or strontium or both.

PATENTED FEB23 1971

3,566,073

INVENTOR.
THOMAS J. BLACK

BY
Meyer, Tilberry & Body
ATTORNEYS.

OUT-OF-POSITION AUTOMATIC CORED WELDING ELECTRODE

This invention pertains to the art of electric arc-welding and, more particularly, to a cored-type welding electrode particularly intended for automatic out-of-position arc-welding.

By "automatic" is meant feeding a welding electrode of indefinite length longitudinally past an electric contact forming part of a welding head toward the workpiece to be welded and simultaneously advancing the electrode laterally to deposit a weld bead. The welding head may be either mechanically supported and sidewardly moved in which case the welding may be referred to as "fully automatic welding" or manually held, in which case the welding is generally referred to as "semiautomatic welding."

By "out-of-position" is meant that the surface of the workpiece being welded is at an angle relative to an upwardly facing horizontal plane. The amount of out-of-position is determined by the angle of the workpiece relative to the horizontal; 0° being upwardly facing horizontal—in which case the welding is termed "downhand"; 90° being vertical; and, 180° being downwardly facing horizontal —in which case the welding is termed "overhead."

In the art of arc-welding, the arc melts both the workpiece to form a molten puddle and the electrode end to form molten droplets which continuously transfer across the arc gap, mix with the metal in the molten puddle and form a weld bead as the metal then rapidly solidifies. Means, such as a granular flux, shielding gases or, and more recently, flux positioned inside of a cored or tubular electrode, are used to shield the arc from the atmosphere.

Cored-type welding electrodes are particularly desirable for out-of-position welding because they do not require externally supplied gases with the attendant pressurized containers, pressure regulator valves, etc. Nor do they require a bulky welding head and heavy hoses connecting the welding head with the containers which make holding the head in an elevated position for semiautomatic welding quite difficult. Cored-type welding electrodes also do not require the use of independently supplied granular fluxes which are not only messy, but extremely difficult, if not impossible, to hold in place when the workpiece angle exceeds 45°.

While the cored-type welding electrode appears to have many attributes which make it suitable for out-of-position welding, heretofore a satisfactory electrode for such purpose has not been commercially available.

A large part of out-of-position welding is performed on the thinner or light gauge sheet metals. Such metals require the use of relatively low arc currents, e.g., on the order of 50 to 100 amperes to prevent burnthrough of the metal. At these low currents, the arc is unstable and undefined and also has insufficient force to transfer the molten droplets from the electrode end to the molten weld pool against the force of gravity.

A further and very severe problem in out-of-position welding, and particularly when the surface angle exceeds 45°, is that gravity exerts a lateral force on the molten weld pool. When this lateral force exceeds the surface tension of the molten weld metal, the entire molten pool simply falls away leaving a crater in the surface of the workpiece.

Cored-type welding electrodes heretofore have worked best at the higher welding currents, e.g., from 300 to 500 amperes. Such currents present two problems as far as out-of-position welding is concerned. They are so high that welding cannot be performed on the thinner gauge metals without burnthrough. Secondly, the higher currents melt so much metal that the amount of molten metal which exists at any one time is usually greater than that which the surface tension of the molten metal can hold in place.

A cored-type electrode containing a flux comprised usually of oxides of one or more metals such as magnesium, titanium, zirconium, aluminum, silicon or the like; and at least one or more highly reactive deoxidizers (or killing agents) such as magnesium, titanium, zirconium, aluminum, silicon, calcium, lithium or the like; and at least one or more halides of the alkali and alkaline earth metal or aluminum fluoride was described and claimed in U.S. Pat. No. 2,909,778 owned by the assignee of this application. The oxides need not always be employed so long as the deoxidizer provides an oxide in the slag system.

One of the better electrodes coming under this patent tried in the development of the present invention was one manufactured, by the assignee of this application under the trademark "NS—3" but even this electrode had such poor arc characteristics at the lower currents as to make it entirely unsatisfactory for out-of-position welding on light gauge metals. Further, as it now appears as the result of the present invention, the slag produced by such electrode was so fluid that it was most difficult or impossible to keep the molten pool in position.

The core of such electrode contains a slag forming and arc protecting system comprised principally of calcium fluoride and highly reactive metals, such as magnesium and aluminum, which react with the oxygen in the air and in the weld metal to form oxides which would then become part of the slag system.

The present invention contemplates a cored-type electrode of this general type containing in addition, other ingredients which overcome all of the difficulties above referred to and enable a cored-type welding electrode to readily perform out-of-position arc welds.

In accordance with the present invention, an electrode of the type referred to has an additional and essential ingredient barium, and/or strontium and/or compounds thereof.

In a more limited aspect, a cored-type electrode has a slag-forming and arc-protecting system comprised principally of calcium fluoride, magnesium and aluminum and/or the oxides thereof and also contains as an additional and essential ingredient (s): barium and/or strontium and/or compounds thereof.

These essential ingredients appear to perform two essential functions: namely, they produce an arc at the lower welding currents having what is generally known as "pinch effect" which is an electromagnetic effect on the arc resulting in an axial force along the longitudinal axis of the electrode, and they seem to change the heat distribution in the arc and modify the composition of the slag in such a manner that results in what appears to be a substantially higher viscosity slag.

The high-viscosity slag tends to provide a dam preventing the molten metal from running out of the weld pool under the force of gravity. The pinch effect provides a confining action on the arc giving it force at the lower currents and assisting in the transfer of the molten metal from the electrode end to a definite spot on the weld pool, thus, assisting the welder in following and laying down a narrow weld bead on the thinner gauge metals. Also, of course, with the lower currents the penetration is less resulting in less danger of burnthrough of the workpiece and also the amount of metal melted off is much less so that the amount of molten metal in the weld pool is less than or approaches that which the surface tension of the molten metal can hold in place against the force of gravity. The electrode also works well at the higher currents.

In the development of the electrode it was realized that if the viscosity of the slag produced by a cored electrode could be sufficiently increased, such slag could then be used as a dam to hold the molten metal in position in the weld pool until it had had a chance to solidify. As indicated, the NS—3M cored electrode proved unsatisfactory. It is now realized that one of the reasons was that the flux had such a low viscosity that it exerted practically no restriction on the molten weld metal to prevent it from falling away. For example, if the NS—3M cored electrode was fed under controlled conditions towards a single spot on the surface of a plate in the 90° out-of-position angle, the molten metal remained in position for approximately 0.09 minutes from the instant that the arc was struck to the instant that the mass of molten metal and slag fell away under the force of gravity. The exact conditions under which these tests were performed are set forth in detail hereinafter and will be referred to herein as "standard procedures." The time will be referred to as the "arc pool breakaway time." Research further indicated that if the slag viscosity could be increased so that it prevented the molten metal from breaking away for longer periods, that out-of-position welding became much easier and that if the viscosity were such that the arc pool breakaway time was in excess of 0.11 minutes in the 90° out-of-position angle, namely a 23 percent increase, that out-of-position welding became quite possible with a cored electrode. However, as the arc pool breakaway time exceeded 0.40 minutes, the slag became so stiff as to make welding difficult.

Thus, in accordance with the invention, a cored electrode is provided wherein the slag system has a viscosity such that the "arc pool breakaway time" under "standard procedures" is between 0.11 and 0.40 minutes.

More specifically, in accordance with the invention, a self-shielded flux cored welding electrode is provided comprised of a tube of low carbon steel having on the inside thereof flux ingredients having the following range of weight percents of the total weight of the electrode.

| Chemical: | Range |
| --- | --- |
| Halides | 1.19–14.11 |
| Oxides and carbonates | 0–8.0 |
| Deoxidizers | 1.64–5.56 |
| Alloying agents as needed or iron powder and cast iron | 0–31.0 |
| Barium and/or strontium and/or compounds thereof | .17–5.10 |
| Balance electrode | |

More specifically the ingredients include:

| Chemical: | Range |
| --- | --- |
| Calcium fluoride | 1.19–12.41 |
| Potassium silico fluoride | 0.00–1.70 |
| Magnesium | 0.34–2.5 |
| Calcium carbonate | 0.00–2.5 |
| Magnesium oxide | 0.00–2.5 |
| Aluminum | 1.30–3.06 |
| Cast iron powder | 0.00–10.30 |
| Iron powder | 0.00–20.0 |
| Aluminum oxide | 0.00–3.00 |
| Barium or strontium or inorganic compounds of barium or strontium | 0.17–5.10 |

Cast iron powder is used to add carbon to the ingredients. Usually such carbon is present in the cast iron in amounts of from 2 to 6 percent. By balancing the amounts of iron powder and cast iron powder, the desired amounts of carbon may be added to the weld bead.

The total weight percent of flux ingredients to total electrode weight is from 11 percent to 35 percent, 13.5 percent to 22.0 percent is preferred.

The principal object of the present invention is the provision of a new and improved cored-type welding electrode which readily welds in all positions.

Another object of the invention is the provision of a new and improved cored welding electrode wherein the slag has a substantially higher viscosity than previously known electrodes.

Still another object of the invention is the provision of a new and improved cored welding electrode wherein in addition to the usual shielding ingredients, barium, strontium or a compound of barium or strontium is included for the purpose of increasing the molten slag viscosity.

Another object of the invention is the provision of a cored-type welding electrode which when fed toward a spot on ¼-inch steel at a 90° angle at 22 volts and 250 amperes provides a molten pool of steel and slag which remains in position for at least 0.11 minutes.

Another object is the provision of an automatic cored electrode which will weld satisfactorily at lower arc currents than heretofore.

Another object of the invention is a cored electrode for automatic welding capable of welding all thicknesses of metal including sheet metal in all electrode positions.

Still another object is the provision of a welding electrode for automatic welding which will weld sheet metal in out-of-position.

The invention may take physical form in certain welding electrodes and slag systems and the characteristics thereof as defined by certain test procedures which are illustrated in the accompanying drawing, which forms a part hereof and wherein.

Figure 1:
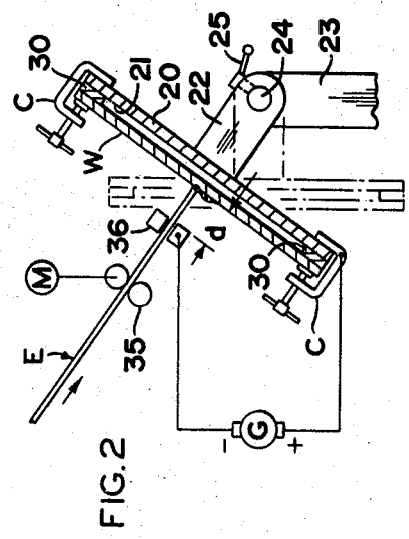
FIG. 1 is a side elevational view of a short length of a welding electrode with portions broken away illustrating a preferred embodiment of the invention.

Referring now to the drawings wherein the showings are for the purposes of illustrating a preferred embodiment of the invention only and not for the purposes of limiting same, FIG. 1 shows a welding electrode E comprised of a tube 10 of steel having on the inside thereof in tightly compacted condition welding ingredients 11 of a formulation in accordance with the present invention, which will produce a slag system of the desired viscosity.

The tube 10 is preferably made from ordinary low carbon or mild steel, as is conventional in the welding art. It may either be a seamless tube or it may be made from a ribbon having its edges 12 in overlapping, or as shown and preferably in abutting relationship.

The electrode of FIG. 1 is manufactured by: providing the various flux ingredients to be described hereinafter in the proper weights and carefully blending them so that they are uniformly distributed throughout the entire mass; providing the steel in the form of a U-shaped ribbon of generally uniform thickness; filling the U with the blended flux ingredients to the desired weight percentage; bringing the ends of the U together to form a tube; and then drawing the tube to the desired final diameter. This drawing operation compacts all of the flux ingredients 11 on the inside of the tube together and prevents the various ingredients from becoming segregated as a result of vibration caused by handling of the electrode, either in shipment or in use.

The diameter of the electrode may be as desired, e.g. from one thirty-second inch to five thirty-second inch. Preferred diameters are one-sixteenth through one-eighth inch. The wall thickness of the preferred electrode is such as to have a cross-sectional area equivalent to a solid electrode of .058 to three thirty-second inches in diameter.

Figure 2:
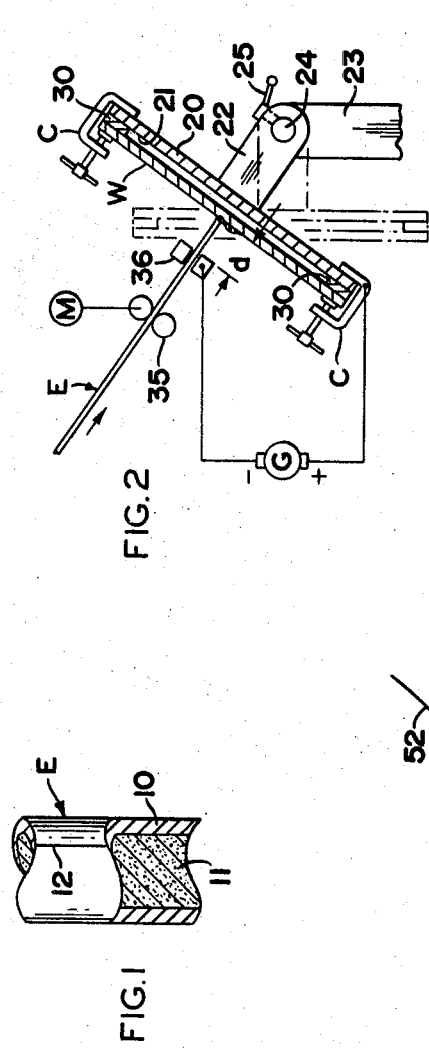
FIG. 2 shows a view somewhat schematic of the test apparatus used in connection with the present invention.

FIG. 2 illustrates a standard test apparatus and procedures developed in connection with the present invention for defining a slag system having a viscosity coming within the scope of the invention. So that this apparatus and procedure may be readily duplicated for future comparison purposes, and for determining infringement, it will be described in considerable detail and will be referred to hereinafter and in the claims as "standard procedures."

Thus in FIG. 2, the apparatus consists of a table 20 having a workpiece facing surface 21. The opposite surface has a leg 22 pivoted by a horizontally extending shaft 24 to a vertically-extending fixed leg 23. Clamping means 25 are provided for clamping the table 20 at any desired angle so that the surface 21 can be moved from 0° when it is horizontal and upwardly facing to 90° when it is vertical. The table 20 is shown in solid lines in the 45° position and in phantom lines in the 90° position.

The workpiece W consists of a flat plate of mild steel having a thickness of one-fourth inch, a width of 2 inches, and a length of 18 inches. The workpiece W is mounted in spaced relationship to the surface 21 by copper blocks having a width of 3 inches, a thickness of three-eighth inch, and length of 1 inch. These blocks are mounted between the workpiece W and the table 20 so that their long edge is flush with the ends of the workpiece W. Clamps C are employed for the purpose of holding the workpiece W in firm heat-conducting and electrical conducting relationship with the blocks 30. The electrode E feeding and energizing apparatus is a conventional handheld welding gun and is shown somewhat schematically as consisting of a pair of electrode feed rolls 35 driven by an electric motor M which can be adjusted to any desired speed, and when once adjusted will operate continuously at such speed. The rolls 35 advance the electrode E past contacts 36, the ends of which are spaced a distance of 1¼ inches from the surface of the workpiece W. This distance is known as the "electrical stick out."

The electrode used in the "standard procedures" was a five sixty-fourth diameter cored-type electrode as previously described above.

Different diameter electrodes will have different optimum welding currents. The larger the electrode the higher will be the optimum current and the greater will be the amount of deposited metal. The greater the amount of deposited metal the more difficult it will be to weld out of position. With a greater amount of deposited metal, the angle from the horizontal will be less for a given breakaway time. It is obvious that a breakaway test could be written for every possible size of electrode, but the five sixty-fourth fourth size was chosen to represent the claims since it is the best choice for out of position welding.

A direct current generator G has its negative terminal connected to the contacts 36 and its positive terminal connected to the workpiece W. No provision is made for advancing the electrode sidewardly relative to the workpiece. In other words, the tests to prove the invention simply involve advancing the electrode E towards a single spot on the workpiece W. The arc pool breakaway time commenced with the striking of the arc and stopped when the molten pool fell away from the spot under the force of gravity.

The generator used was a standard SAF 300—F 162 gas engine welding generator manufactured by The Lincoln Electric Company of Cleveland, Ohio, the assignee of this application. The generator voltage-ampere curve was such that at no current the open circuit voltage at the terminals was 30 volts, at 250 amperes the voltage was 22 volts, and at short circuit the current was 750 amperes.

The electrode E to be tested was inserted and fed toward a specimen workpiece and the proper adjustments of the speed of the motor M made so that the welding current was 250 amperes as measured on a standard meter. The workpiece W at room temperature was clamped on the worktable, as shown, and the table then moved to the desired angle. The electrode E was then fed on a line of movement at right angles to the surface of the workpiece W toward a single spot. At the moment that the arc was struck, the timing started and thereafter the molten slag and metal were allowed to build up. The slag formed a circular dam surrounding and supporting the molten metal as a puddle in the middle. After a definite time interval, the weight of the molten slag and metal overcame the viscosity of the slag and the pile of molten metal and slag completely collapsed and fell away. At this moment, the timing was stopped. These tests were repeated for various out-of-position angles and the arc pool breakaway time for each electrode E was plotted against the out-of-position angle.

Figure 3:
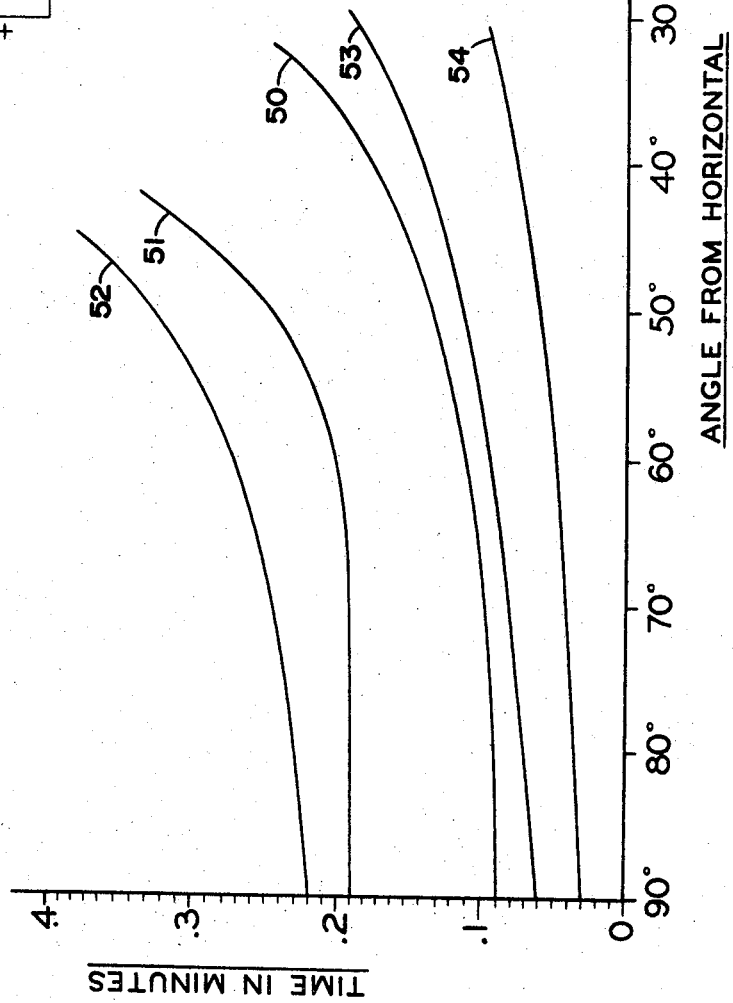
FIG. 3 is a graph showing the arc pool breakaway time obtained with various electrodes plotted against the out-of-position angle of the workpiece surface.

The results are shown in FIG. 3. Curve 50 is the curve of an electrode manufactured by The Lincoln Electric Company, the assignee of this application under the trademark NS—3M, and was the best curve of any electrode then obtainable. At a 90° angle, the maximum arc pool breakaway time obtainable was 0.09 minutes, which time increased but slightly as the out-of-position angle was decreased until the out-of-position angle was approximately 60°, at which time the time increased substantially. The arc pool breakaway time of curve 50 is unsatisfactory for welding in the 90° of out-of-position angle.

As indicated, it was found that if the arc pool breakaway time at the 90° out-of-position angle could be increased to 0.11 minutes that then an electrode could perform satisfactorily in all out-of-position angles. In accordance with the invention, an electrode is provided where under the standard procedures and at the 90° out-of-position angle, the arc pool breakaway time for the mass of molten metal and slag must be in excess of 0.11 minutes. Curve 51 shows the results obtainable with electrode I, the preferred embodiment of the invention. The time in minutes of curve 51 is approximately 110 percent greater than the time in minutes for the time of curve 50 at the 90° out-of-position angle, a substantial improvement.

Curve 52 shows the results obtained with electrode V, it being noted that the time at the 90° out-of-position angle is approximately 144 percent greater than the time in minutes of curve 50 which, as stated, was the best electrode then known for this purpose. The slag system of electrode V is more viscous, such that welding with it becomes somewhat more difficult in some applications. It is believed the upper limit of viscosity for the usual applications will be about 0.40 minutes at 90° from the horizontal.

The following are compositions of a flux illustrating preferred embodiments of the invention with the weights being given in percentages of the total weight of the electrode:

Electrode I

| | Percent |
|---|---|
| Calcium fluoride | 4.30 |
| Potassium silico fluoride [1] | 0.18 |
| Magnesium oxide | 0.75 |
| Aluminum oxide | 0.75 |
| Calcium carbonate | 0.38 |
| Magnesium | 0.96 |
| Aluminum | 2.25 |
| Cast iron powder [2] | 4.30 |
| Barium fluoride | 1.13 |
| Balance electrode | 85.00 |
| | 100.00 |

[1] Composed of:

| | |
|---|---|
| Silicon | 12.7 |
| Potassium | 35.0 |
| Fluorine | 51.0 |
| Impurities | 1.3 |
| | 100.0 |

[2] 4–6% Carbon.

The total weight percent of the flux ingredients to the total electrode weight can vary from 11 percent to 35 percent, but 13.5 percent to 22.0 percent is preferred.

Other compositions illustrating preferred embodiments of the invention comprise substituting for the barium fluoride of the above composition the following:

Electrode II

| | Percent |
|---|---|
| Barium titanate | 1.02 |

Electrode III

| | |
|---|---|
| Barium carbonate | 1.02 |

Electrode IV

| | |
|---|---|
| Barium tetra aluminide | 1.02 |

Electrode V

| | |
|---|---|
| Barium fluoride | 1.53 |

Electrode VI

| | |
|---|---|
| Strontium fluoride | 1.02 |

Electrode VII

Another formulation which has worked satisfactorily is as follows:

| | Percent |
|---|---|
| Calcium fluoride | 3.89 |
| Potassium silico fluoride | 0.17 |
| Magnesium | 0.87 |
| Calcium carbonate | 0.34 |
| Magnesium oxide | 0.68 |
| Aluminum | 2.38 |
| Cast iron powder (4–6% carbon) | 5.61 |
| Iron powder | 2.04 |
| Barium fluoride | 1.02 |
| Balance electrode | 83.00 |
| | 100.00 |

It is to be noted that in all of the embodiments listed a compound of barium or strontium is found. An extensive series of tests indicated that no other elements but barium or strontium will increase the viscosity of the slag to give the results necessary for the present invention.

U.S. Pat. No. 2,909,778 in example 12 lists barium fluoride as the shielding patent. No other fluorides are specified in this example. An electrode to this formulation, but with iron powder fill added, was manufactured and subjected to "standard procedures." The results of formula 12 with 10.00 percent iron powder added, such that the total fill was 16.75 percent of the electrode weight, are shown in curve 53—it being noted that the results are definitely inferior to those of curve 50.

A similar formulation was made wherein the amount of iron powder was increased to 19.30 percent of the total electrode weight and the total fill was 24.52 percent of the total electrode weight. The results of such an electrode are shown in curve 54, it being noted that these results are worse than those of curve 53.

In the formula of example 12, the barium fluoride is employed as the shielding medium. In the electrode of the present invention, calcium fluoride is principally employed as the shielding medium. The magnesium and aluminum function as deoxidizers while their oxides contribute to the slag viscosity along with the barium or strontium compound which is employed both for the purpose of increasing the viscosity of the slag as well as giving a pinch effect on the molten metal as it forms on the electrode end forcing it to transfer to the workpiece in small droplets. It is apparent from a study of curves 53 and 54 in relation to curves 51 and 52 that barium fluoride alone will not accomplish the desired results. Without desiring to limit the invention, it is believed that the higher viscosity results from the combination of all the compounds in the slag system, e.g., calcium fluoride, aluminum oxide, magnesium oxide, and the barium or strontium ion, it being known that the heat distribution in the arc, the freezing temperatures and the viscosity of a molten slag mixture will vary with changes in the relative proportions of the various elements or compounds as contained therein.

A still further embodiment of the invention is as follows:

| | |
|---|---|
| Calcium fluoride | 4.52 |
| Magnesium | 1.34 |
| Calcium carbonate | 1.27 |
| Magnesium oxide | .83 |
| Aluminum | 2.15 |
| Cast iron powder (2.5% C.) | 0.79 |
| Barium fluoride | 1.24 |
| Ferro titanium | .03 |
| Iron powder | 4.33 |
| Balance electrode | 83.50 |
| | 100.00 |

Obviously, other ingredients may be included in the core for the purpose of alloying the weld metal, improving slagging characteristics and the like without departing from the invention.

The invention has been described with reference to preferred embodiments. Obviously, modifications and alterations will occur to others upon a reading and understanding of this specification and it is my intention to include all such modifications and alterations insofar as they come within the scope of the appended claims.

I claim:

1. An arc-welding electrode comprised of a tube of mild steel having on the inside thereof as major ingredients 0.34—5.56 of one or more highly reactive deoxidizer (s) taken from the class consisting of magnesium, aluminum, zirconium, titanium, calcium, lithium, and the like; 1.19—12.41 of one or more materials selected from the class consisting of calcium fluoride, the halides of the alkali metals and the alkaline earth metals other than barium and strontium and/or materials capable of breaking down or combining in the heat of the arc to form such halides; and barium and/or strontium and/or compounds thereof in the amounts of .17—5.10.

2. An arc-welding electrode comprised of a tube of mild steel having on the inside thereof as major ingredients one or more highly reactive deoxidizer(s) taken from the class consisting of magnesium, aluminum, zirconium, titanium, calcium, lithium and the like; one or more materials selected from the class consisting of aluminum fluoride, the halides of alkali metals and the alkaline earth metals other than barium and strontium and/or materials capable of breaking down or combining in the heat of the arc to form such halides; the improvement which comprises barium and/or strontium and/or compounds thereof, said ingredients being comprised of the following elements or compounds in percent weight of the total electrode weight:

| Chemical: | Range |
|---|---|
| Halides of alkali and alkaline earth metals other than barium and strontium | 1.19–14.11 |
| Oxides and carbonates | 0–8.0 |
| Deoxidizers | 1.64–5.56 |
| Alloying agents as needed or iron powder and cast iron | 0–31.0 |
| Barium and/or strontium and/or compounds thereof | .17–5.10 |
| Balance electrode. | |

3. An arc welding electrode comprised of a tube of mild steel having on the inside thereof ingredients comprised of the following elements or compounds in percent weight of the total electrode weight:

| Chemical: | Range |
|---|---|
| Calcium fluoride | 1.19–12.41 |
| Potassium silico fluoride | 0.00–1.70 |
| Magnesium | 0.34–2.5 |
| Calcium carbonate | 0.00–2.5 |
| Magnesium oxide | 0.00–2.5 |
| Aluminum oxide | 0.00–3.0 |
| Aluminum | 1.3–3.06 |
| Cast iron powder | 0.00–10.03 |
| Iron powder | 0.00–20.0 |
| Barium and/or strontium and/or compounds thereof | 0.17–5.10 | the weight of said flux ingredients to the weight of said electrode being 11 — 35 percent.

4. An arc-welding electrode comprised of a tube of mild steel having on the inside thereof as major ingredients one or more highly reactive deoxidizer(s) taken from the class consisting of magnesium, aluminum, zirconium, titanium, calcium, lithium and the like; one or more materials selected from the class consisting of aluminum fluoride, the halides of alkali metals and the alkaline earth metals other than barium and strontium and/or materials capable of breaking down or combining in the heat of the arc to form such halides; the improvement which comprises incorporating in said ingredients barium fluoride.

5. An arc welding electrode comprised of a tube of mild steel having on the inside thereof as major ingredients one or more highly reactive deoxidizer(s) taken from the class consisting of magnesium, aluminum, zirconium, titanium, calcium, lithium and the like; one or more materials selected from the class consisting of aluminum fluoride, the halides of alkali metals and the alkaline earth metals other than barium and strontium and/or materials capable of breaking down or combining in the heat of the arc to form such halides; the improvement which comprises incorporating in said ingredients barium titanate.

6. An arc-welding electrode comprised of a tube of mild steel having on the inside thereof as major ingredients one or more highly reactive deoxidizer(s) taken from the class consisting of magnesium, aluminum, zirconium, titanium, calcium, lithium and the like, one or more materials selected from the class consisting of aluminum fluoride, the halides of alkali metals and the alkaline earth metals other than barium and strontium and/or materials capable of breaking down or combining in the heat of the arc to form such halides; the improvement which comprises incorporating in said ingredients barium carbonate.

7. An arc-welding electrode comprised of a tube of mild steel having on the inside thereof as major ingredients one or more highly reactive deoxidizer(s) taken from the class consisting of magnesium, aluminum, zirconium, titanium, calcium, lithium and the like; one or more materials selected from the class consisting of aluminum fluoride, the halides of alkali metals and the alkaline earth metals other than barium and strontium and/or materials capable of breaking down or combining in the heat of the arc to form such halides; the improvement which comprises incorporating in said ingredients barium tetra aluminide.

8. An arc-welding electrode comprised of a tube of mild steel having on the inside thereof as major ingredients one or more highly reactive deoxidizer(s) taken from the class consisting of magnesium, aluminum, zirconium, titanium, calcium, lithium and the like; one or more materials selected from the class consisting of aluminum fluoride, the halides of alkali metals and the alkaline earth metals other than barium and strontium and/or materials capable of breaking down or combining in the heat of the arc to form such halides; the improvement which comprises incorporating in said ingredients strontium fluoride.

9. An arc-welding electrode comprised of a tube of mild steel having on the inside thereof as major ingredients one or more highly reactive deoxidizer(s) taken from the class consisting of magnesium, aluminum, zirconium, titanium, calcium, lithium and the like; one or more materials selected from the class consisting of aluminum fluoride, the halides of alkali metals and the alkaline earth metals other than barium and strontium and/or materials capable of breaking down or combining in the heat of the arc to form such halides; the improvement which comprises barium and/or strontium and/or compounds thereof, said electrode having an arc pool breakaway time under standard conditions between 0.11 and 0.40 minutes.

10. Electrode of claim 3 wherein said ingredients are approximately as follows:

| | Percent |
|---|---|
| Calcium fluoride | 4.30 |
| Potassium silico fluoride | 0.18 |
| Magnesium oxide | 0.75 |
| Aluminum oxide | 0.75 |
| Magnesium | 0.96 |
| Calcium carbonate | 0.38 |
| Aluminum | 2.25 |
| Cast iron powder (4–6% carbon) | 4.30 |
| Barium fluoride | 1.13 |
| Balance electrode steel | 85.00 |
| | 100.00 |

11. Electrode of claim 3 wherein said ingredients are approximately as follows:

| | Percent |
|---|---|
| Calcium fluoride | 3.89 |
| Potassium silico fluoride | 0.17 |
| Magnesium | 0.87 |
| Calcium carbonate | 0.34 |
| Magnesium oxide | 0.68 |
| Aluminum | 2.38 |
| Cast iron powder (4–6% carbon) | 5.61 |
| Iron powder | 2.04 |
| Barium fluoride | 1.02 |
| Balance electrode | 83.00 |
| | 100.00 |

12. An arc-welding electrode comprised of a tube of mild steel having on the inside thereof ingredients approximately as follows:

| | Percent |
|---|---|
| Calcium fluoride | 4.52 |
| Magnesium | 1.34 |
| Calcium carbonate | 1.27 |
| Magnesium oxide | .83 |
| Aluminum | 2.15 |
| Cast iron powder (2.5% C) | 0.79 |
| Barium fluoride | 1.24 |
| Ferro titanium | .03 |
| Iron powder | 4.33 |
| Balance electrode | 83.50 |
| | 100.00 |

13. The electrode of claim 3, wherein said ingredients include alloying constituents.

14. A method of out-of-position arc-welding a steel workpiece which comprises: feeding a self-shielded consumable electrode comprised of a metal steel tube containing slag-forming ingredients including at least one member from the group consisting of barium, strontium and compounds thereof in small effective amounts to stabilize arcs at low currents and to provide viscous slags during welding; and passing current between said workpiece and said electrode to establish an arc, which melts a portion of said workpiece to form an arc pool and which melts and transfers metal and slag-forming ingredients from said electrode to said arc pool to produce a viscous slag over the arc pool to provide a breakaway time in excess of 0.11 minute as determined for an electrode five sixty-fourth inch in diameter and melted against a plate in the 90° position under standard conditions.

15. The method described in claim 14, wherein said current is in the range between about 50 amperes and 100 amperes to minimize burnthrough of said workpiece.

16. The method of claim 14, wherein said ingredients are comprised of the following elements or compounds in percent weight of the total electrode weight:

| Chemical: | Range |
|---|---|
| Halides | 1.19–14.11 |
| Oxides and carbonates | 0–8.0 |
| Deoxidizers | 1.64–5.56 |
| Alloying agents as needed or iron powder and cast iron | 0–31.0 |
| Barium and/or strontium and/or compounds thereof | .17–5.10 |
| Balance electrode. | |

17. The method of claim 14, wherein said ingredients are comprised of the following elements or compounds in percent weight of the total electrode weight:

| Chemical: | Range |
|---|---|
| Calcium fluoride | 1.19–12.41 |
| Potassium silico fluoride | 0.00–1.70 |
| Magnesium | 0.34–2.5 |
| Calcium carbonate | 0.00–2.5 |
| Magnesium oxide | 0.00–2.5 |
| Aluminum oxide | 0.00–3.0 |
| Aluminum | 1.3–3.06 |
| Cast iron powder | 0.00–10.03 |
| Iron powder | 0.00–20.0 |
| Barium and/or strontium and/or compounds thereof | 0.17–5.10 | the weight of said flux ingredients to the weight of said electrode being 11 – 35 percent.

18. The method of claim 14, wherein said ingredients are approximately as follows:

| | Percent |
|---|---|
| Calcium fluoride | 4.30 |
| Potassium silico fluoride | 0.18 |
| Magnesium oxide | 0.75 |
| Aluminum oxide | 0.75 |
| Magnesium | 0.96 |
| Calcium carbonate | 0.38 |
| Aluminum | 2.25 |
| Cast Iron Powder (4–6% carbon) | 4.30 |
| Barium fluoride | 1.13 |
| Balance electrode steel | 85.00 |
| | 100.00 |

19. The method of claim 14, wherein said ingredients are approximately as follows:

| | Percent |
|---|---|
| Calcium fluoride | 3.89 |
| Potassium silico fluoride | 0.17 |
| Magnesium | 0.87 |
| Calcium carbonate | 0.34 |
| Magnesium oxide | 0.68 |
| Aluminum | 2.38 |
| Cast iron powder (4-6% carbon) | 5.61 |
| Iron powder | 2.04 |
| Barium fluoride | 1.02 |
| Balance electrode | 83.00 |
| | 100.00 |

20. The method of claim 14, wherein said ingredients are approximately as follows:

| | Percent |
|---|---|
| Calcium fluoride | 4.52 |
| Magnesium | 1.34 |
| Calcium carbonate | 1.27 |
| Magnesium oxide | 0.83 |
| Aluminum | 2.15 |
| Cast iron powder (2.5% C) | 0.79 |
| Barium fluoride | 1.24 |
| Ferro titanium | 0.03 |
| Iron powder | 4.33 |
| Balance electrode | 83.50 |
| | 100.00 |

UNITED STATES PATENT AND TRADEMARK OFFICE
CERTIFICATE OF CORRECTION

PATENT NO. : 3,566,073
DATED : February 23, 1971
INVENTOR(S) : Thomas Joseph Black It is certified that error appears in the above-identified patent and that said Letters Patent are hereby corrected as shown below:

Claim 1, Column 7:

line 68, delete "0.34." and substitute ---1.64---, and line 72, delete "calcium" and substitute ---aluminum---.

Signed and Sealed th

Fifteenth Day of Novemb

[SEAL]

Attest:

RUTH C. MASON
Attesting Officer

LUTRELLE F. PARKER
Acting Commissioner of Patents and Tra